United States Patent

Blinne et al.

[11] Patent Number: 4,551,493
[45] Date of Patent: Nov. 5, 1985

[54] TRANSPARENT FLAME-RETARDANT POLY(ARYLETHER-ARYLSULFONE) MOLDING MATERIALS

[75] Inventors: Gerd Blinne, Bobenheim; Volker Muench, Ludwigshafen, both of Fed. Rep. of Germany

[73] Assignee: BASF Aktiengesellschaft, Fed. Rep. of Germany

[21] Appl. No.: 581,715

[22] Filed: Feb. 21, 1984

[51] Int. Cl.[4] ............................................. C08L 81/06
[52] U.S. Cl. ...................................... 524/89; 524/258; 524/323; 524/339; 524/370; 524/371; 524/372; 524/373; 524/540; 524/609; 524/611; 525/534; 525/535
[58] Field of Search ............... 524/323, 339, 370, 371, 524/372, 373, 540, 609, 611, 89, 258; 525/534, 535

[56] References Cited

U.S. PATENT DOCUMENTS

| | | | |
|---|---|---|---|
| 3,830,766 | 8/1974 | Praetzel et al. | 524/373 |
| 3,883,481 | 5/1975 | Kopetz et al. | 524/373 |
| 3,989,531 | 11/1976 | Orlando et al. | 524/373 |
| 4,038,248 | 7/1977 | Anderson | 524/373 |
| 4,041,013 | 8/1977 | Anderson | 524/373 |
| 4,049,619 | 9/1977 | Anderson | 260/45.75 B |
| 4,170,711 | 10/1979 | Orlando et al. | 524/373 |

FOREIGN PATENT DOCUMENTS 2903100  7/1980  Fed. Rep. of Germany .

*Primary Examiner*—Lester L. Lee
*Attorney, Agent, or Firm*—Keil & Weinkauf

[57] ABSTRACT

Transparent flame-retardant poly(arylether-arylsulfone) molding materials preferably contain not less than 50% by weight of units of the formula

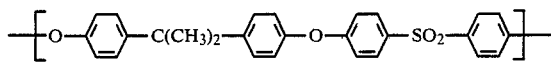

and, as a flameproofing agent, from 0.1 to 10% by weight, based on the weight of poly(arylether-arylsulfone), of a poly(2,6-dibromophenylene 1,4-oxide) having a molecular weight of from 1000 to 20000, and, if required, a heat stabilizer.

The molding materials are useful for the production of shaped articles, films and fibers.

8 Claims, No Drawings

TRANSPARENT FLAME-RETARDANT POLY(ARYLETHER-ARYLSULFONE) MOLDING MATERIALS

Aromatic polysulfones form the subject of a large number of publications, patents and patent applications. Examples of such publications include J. Chem. Soc. (1961), 1604–1610, J. Polym. Sci. 40 (1959), 399–406, GB-A No. 1 078 234, GB-A No. 1 016 245 and GB-A No. 1 060 546.

Poly(arylether-arylsulfones) containing units of the formula

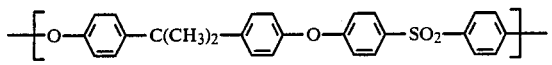

are very useful industrially. For many fields of use, however, high thermal stability as well as good flame-retardance is of considerable importance.

A large number of measures for rendering plastics, including, for example, polyarylsulfones, flame-retardant by means of suitable additives have been described. According to DE-A No. 2 903 100 (GB-A No. 2 039 503), the addition of organic sulfonates leads to self-extinguishing poly(arylether-arylsulfones). According to U.S. Pat. No. 4,049,619, flame-retardant poly(arylether-arylsulfones) can be prepared with the aid of bromoaromatic ethers, e.g. 1,2-bis(2,4,6-tribromophenoxy)ethane, 1,3-bis(2,4,6-tribromophenoxy)propane or 1,2-bis(2,3,4,5,6-pentabromophenoxy)ethane and oxides of antimony, arsenic or bismuth.

The disadvantage of the processes given as examples and of the conventional flame-retardant poly(arylether-arylsulfones) is that the molding materials lose their transparency due to the addition of the flameproofing agents, have a pronounced tendency to decompose and are volatile at the high processing temperatures. The two last-mentioned disadvantageous properties result in poorer flame retardance and undesirable discolorations.

It is an object of the present invention to provide flame-retardant poly(arylether-arylsulfone) molding materials without the good transparency of the unmodified molding materials being adversely affected by the additives.

We have found, surprisingly, that this object is achieved by the use of poly(2,6-dibromophenylene 1,4-oxides) as flameproofing agents, with or without heat stabilizers.

The present invention hence relates to transparent flame-retardant poly(arylether-arylsulfone) molding materials which contain a poly(2,6-dibromophenylene 1,4-oxide) as a flameproofing agent.

Poly(2,6-dibromophenylene 1,4-oxides) which can be used in accordance with the invention have molecular weights of from 1000 to 20,000, preferably from 2000 to 6000, and are prepared by polycondensation of 2,4,6-tribromophenol in the presence of an alkali metal hydroxide, e.g. sodium hydroxide, by a conventional process, for example as described in DE-A No. 2 948 263, or DE-A No. 3 002 658 or by S. Yoshida and H. Kawahara in American Chemical Society, Division of Polymer Chemistry, Polymer Preprints, Volume 20, part 1 (1979), pages 861–862 or J. F. Harrod, P. van Gheluwe, D. Kisakurek and A. Shaver in Macromolecules, volume 14 (1981), pages 565–570.

Depending on the poly(arylether-arylsulfones) and on the additives and assistants which may be present in the molding materials, the poly(2,6-dibromophenylene 1,4-oxides) are used in amounts of from 0.1 to 10.0, preferably from 0.5 to 3.0, % by weight, based on the weight of the poly(arylether-arylsulfones). In the case of pure poly(arylether-arylsulfones), from 0.1 to 3.0% by weight of the novel flameproofing agent has proven particularly useful.

In a preferred embodiment, in addition to the poly(2,6-dibromophenylene 1,4-oxide), from 0.1 to 5.0, preferably from 0.3 to 3, % by weight, based on the weight of the poly(arylether-arylsulfone), of a conventional heat stabilizer is incorporated into the transparent flame-retardant poly(arylether-arylsulfone) molding material.

Preferred heat stabilizers are sterically hindered phenols, as marketed, for example, under the Ciba Geigy trademark ® Irganox, and in particular cyclic and/or linear diphenylamine/acetone condensates having molecular weights of from 227 to 624.

Suitable diphenylamine/acetone condensates can be prepared by condensation of diphenylamine and acetone in a molar ratio of from 1:1 to 2:1, preferably from 1:1 to 1.5:1 by conventional methods described in, for example, U.S. Pat. Nos. 1,906,935, 1,975,167 and 2,002,642.

For the condensation with acetone, the diphenylamine can be employed together with aromatics which are unsubstituted or substituted, for example by linear or branched alkyl groups of 1 to 4 carbon atoms, the molar ratio of diphenylamine to aromatics being from 1:2 to 2:1, preferably 1:2. Examples include ethyl benzene, n-propyl benzene, isopropyl benzene, n-butyl benzene, sec.-butyl benzene and preferably toluene and benzene, as well as mixtures of aromatics.

Examples of suitable cyclic or linear diphenylamine/acetone condensates are compounds of the general formulae

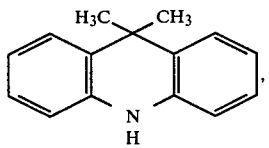,

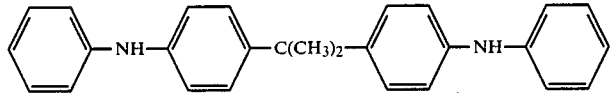

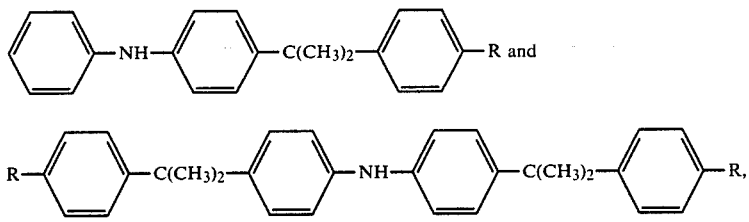

where the radicals R are identical or different and are each preferably alkyl of 1 to 4 carbon atoms and in particular methyl and/or hydrogen. Compounds which have proven particularly useful and are therefore preferably used are

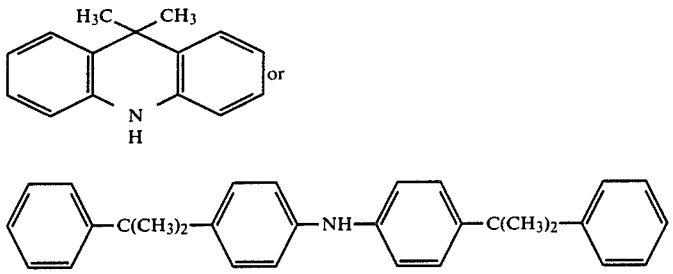

The sterically hindered phenols and the cyclic or linear diphenylamine/acetone condensates having molecular weights of from 227 to 624 can be employed individually or as mixtures, including industrial mixtures.

Poly(arylether-arylsulfone) molding materials which have proven to be particularly useful and are therefore preferably used are those which contain from 0.1 to 10, preferably from 0.1 to 3, % by weight of a poly(2,6-dibromophenylene 1,4-oxide) and from 0.1 to 5, preferably from 0.3 to 3.0, % by weight of

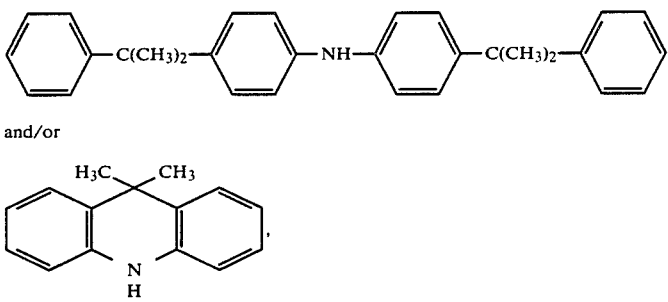

and/or the percentages being based on the weight of the poly(arylether-arylsulfone).

The amounts of novel flameproofing agent and heat stabilizer incorporated have virtually no adverse effect on the transparency of the molding materials.

The poly(2,6-dibromophenylene 1,4-oxides) which can be employed according to the invention are useful for flameproofing aromatic polysulfones which contain repeating units of the formula

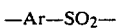
—Ar—SO$_2$—

Where Ar is a divalent aromatic radical. The transparent flame-retardant molding materials are prepared using, in particular, poly(arylether-arylsulfones) which essentially consist of units of the formula

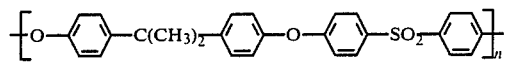

Where n is an integer from 30 to 100, preferably from 40 to 80. However, owing to the great variability in the mechanical properties, aromatic polysulfones have also proven useful, so that compounds of this type which consist of not less than 50% by weight, based on the total weight of the aromatic polysulfones, of units of the formula and furthermore contain condensed units of comonomers are likewise preferred. When condensed, suitable comonomers give, for example, units of the formula

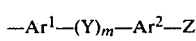
—Ar$^1$—(Y)$_m$—Ar$^2$—Z where Ar$^1$ and Ar$^2$ are each an unsubstituted or substituted aromatic radical which may be identical or different, Y is —SO$_2$—, —S—, —S—S—, —CO—, C$_1$-C$_{12}$-alkylene, C$_2$-C$_{12}$-alkylidene, C$_5$-C$_{12}$-cycloalkylene or C$_7$-C$_{12}$-arylalkylene, m is 0 or 1 and Z is -O- or -S-.

Aromatic polysulfones of this type have molecular weights of from 15,000 to 50,000, preferably from 20,000 to 40,000, and intrinisic viscosities (measured at 20° C. in a 1% strength by weight N-methylpyrrolidone solution) of from 0.35 to 0.85, preferably from 0.40 to 0.70.

The novel poly(arylether-arylsulfone) molding materials are advantageously prepared by mixing the molten poly(arylether-arylsulfone) which, as stated above, preferably contains not less than 50% by weight of units of the formula

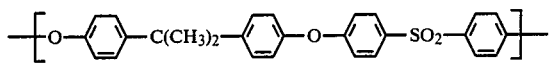

with the poly(2,6-dibromophenylene 1,4-oxide) and, if required, a heat stabilizer, for example with the aid of a kneader, an intensive mixer, a stator-rotor mixer, a roll mill or, preferably, an extruder at from 280° to 380° C., preferably from 300° to 360° C. In another version of the process, the pulverulent of granulated poly(arylether-arylsulfones) can be powdered with the flameproofing agent and, where relevant, the heat stabilizer, or can be treated with solutions of these, and the molding material can then be dried.

If transparency is only of minor importance with regard to the use of the materials, or is not required, the novel poly(arylether-arylsulfone) molding materials can be mixed with other thermoplastics, e.g. polyesters, nylons, polyurethanes, polyolefines, polyvinyl chloride or polyoxymethylenes, in amounts of from 5 to 50, preferably from 20 to 50, % by weight, based on the poly(arylether-arylsulfone). Furthermore, they can be modified with reinforcing fillers, transparent or opaque pigments and other assistants and additives.

Examples of reinforcing fillers are asbestos, coal and preferably glass fibers, the latter being used, for example, in the form of glass fabrics, glass mats, surfacing mats and/or preferably glass rovings or cut glass filaments obtained from low-alkali E glass and having a diameter of from 5 to 20, preferably from 8 to 15 μm; after incorporation, the glass fibers have a mean length of from 0.05 to 1, preferably from 0.1 to 0.5, mm. The poly(arylether-arylsulfone) molding materials reinforced with glass rovings or cut glass filaments contain from 10 to 60, preferably from 20 to 50, % by weight, based on the total weight, of the reinforcing agent, while the impregnated glass fabrics, glass mats and/or surfacing mats contain from 10 to 80, preferably from 30 to 60, % by weight, based on the total weight, of poly(arylether-arylsulfones). Examples of suitable pigments are titanium dioxide, cadmium sulfide, zinc sulfide, barium sulfate and carbon black. Examples of other additives and assistants are dyes, lubricants, e.g. graphite or molybdenum disulfide, abrasives, e.g. carborundum, light stabilizers and hydrolysis retardants. The pigments, additives and assistants are conventionally employed in amounts of from 0.01 to 3% by weight, based on the weight of poly(arylether-arylsulfone).

The poly(arylether-arylsulfone) molding materials according to the invention are used for producing shaped articles, films and fiber.

The Examples and Comparative Examples which follow illustrate the invention. Parts and percentages are by weight. The test for flame retardance was carried out as a vertical burning test for classification under the fire classes 94 VE-0, 94 VE-1 or 94 VE-2, in accordance with the methods of the Underwriter's Laboratories (J. Troitzsch, Brandverhalten von Kunststoffen, Hanser-Verlag, Munich, Vienna, 1981, pages 397–399. The test samples used were ⅛" bars.

EXAMPLES AND COMPARATIVE EXAMPLES

General method

The flameproofing agents and, where relevant, heat stabilizers shown in the Table below, together with a poly(arylether-arylsulfone) which essentially consisted of repeating units of the formula

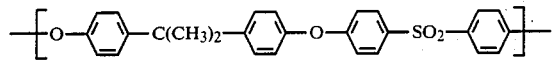

(®Udel P-1700 from Union Carbide Corp.), were melted and homogenized at 330° C. in an extruder, and then granulated. Using an injection molding technique, the granules were converted at 330° C. to test samples, and these were used to determine the transparency, the color and the flammability rating.

In the Table, the heat stabilizers are indicated as follows:

445: 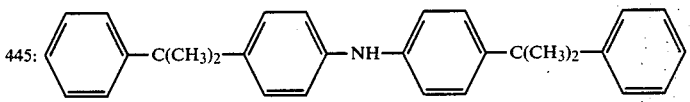

(® Naugard 445 from Uniroyal)
1010: sterically hindered phenol
(® Irganox 1010 from Ciba Geigy).

| | Flameproofing agent | | Heat stabilizer | | | | |
|---|---|---|---|---|---|---|---|
| | Type | Amount [%] | Type | Amount [%] | Color | Transparency | UL*-94 Test |
| Example | | | | | | | |
| 1 | Poly(2,6-dibromo-phenylene 1,4-oxide) (molecular weight 5000) | 0.2 | — | — | Very pale | Very good | VE-1 |
| 2 | Poly(2,6-dibromo-phenylene 1,4-oxide) (molecular weight | 0.5 | — | — | Very pale | Very good | VE-1 |

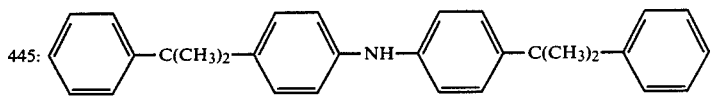

(® Naugard 445 from Uniroyal)
1010: sterically hindered phenol
(® Irganox 1010 from Ciba Geigy).

| | Flameproofing agent | | Heat stabilizer | | Color | Transparency | UL*-94 Test |
|---|---|---|---|---|---|---|---|
| | Type | Amount [%] | Type | Amount [%] | | | |
| 3 | Poly(2,6-dibromo-phenylene 1,4-oxide) (molecular weight 5000) | 1.0 | — | — | Pale | Very good | VE-0 |
| 4 | Poly(2,6-dibromo-phenylene 1,4-oxide) (molecular weight 5000) | 3.0 | — | — | Pale | Very good | VE-0 |
| 5 | Poly(2,6-dibromo-phenylene 1,4-oxide) (molecular weight 5000) | 0.5 | 445 | 0.5 | Pale | Very good | VE-0 |
| 6 | Poly(2,6-dibromo-phenylene 1,4-oxide) (molecular weight 5000) | 0.5 | 1010 | 0.5 | Very pale | Very good | VE-0 |
| Comparative Examples | | | | | | | |
| 1 | — | — | — | — | Very pale | Very good | VE-2 |
| 2 | —SO₃Na | 1.0 | — | — | Beige | Opaque | VE-0 |
| 3 | Antimony trioxide | 3.0 | — | — | Beige | Opaque | VE-0 |
| 4 | Decabromodiphenyl ether | 3.0 | — | — | Brown | Good | VE-2 |

*Underwriter's Laboratories

The Examples and Comparative Examples showed that only poly(arylether-arylsulfone) molding materials which contained, as flameproofing agents, the novel poly(2,6-dibromophenylene 1,4-oxides) having a molecular weight of about 2000 to 6000 were flame-retardant and at the same time transparent, and had a pale color.

We claim:

1. A transparent, flame-retardant molding composition which comprises:
   poly(arylether-arylsulfone) molding material, and
   an effective amount of a poly(2,6-dibromophenylene 1,4-oxide) as a flameproofing agent.

2. A transparent flame-retardant poly(arylether-arylsulfone) molding material as set forth in claim 1, wherein the poly(2,6-dibromophenylene 1,4-oxide) has a molecular weight of from 1000 to 20,000.

3. A transparent flame-retardant poly(arylether-arylsulfone) molding material as set forth in claim 1, which contains the poly(2,6-dibromophenylene 1,4-oxide) in an amount of from 0.1 to 10.0% by weight, based on the weight of poly(arylether-arylsulfone).

4. The molding material of claim 1, which further contains a heat stabilizer.

5. The molding material of claim 1, which contains a poly(2,6-dibromophenylene 1,4-oxide) and, in addition, from 0.1 to 5.0% by weight, based on the weight of poly(arylether-arylsulfone), of a heat stabilizer from the group consisting of cyclic and/or linear diphenylamine-/acetone condensates.

6. A transparent flame-retardant poly(arylether-arylsulfone) molding material as set forth in claim 1, which contains
   from 0.1 to 10.0% by weight of a poly(2,6-dibromophenylene 1,4-oxide) and
   from 0.1 to 5.0% by weight of

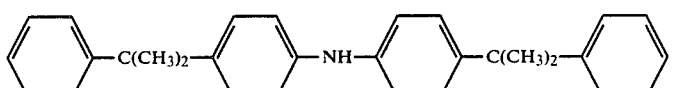

and/or

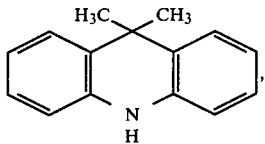

the percentages being based on the weight of the poly(arylether-arylsulfone).

7. A transparnt flame-retardant poly(arylether-arylsulfone) molding material as set forth in claim 1, wherein the poly(arylether-arylsulfone) contains not less than 50% by weight of units of the formula

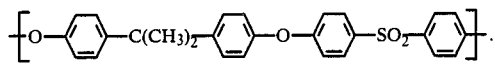

8. A transparent flame-retardant poly(arylether-arylsulfone) molding material as set forth in claim 1, wherein the poly(arylether-arylsulfone) essentially consists of units of the formula

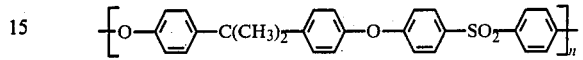

where n is an integer from 30 to 100.

* * * * *

UNITED STATES PATENT AND TRADEMARK OFFICE
CERTIFICATE OF CORRECTION

PATENT NO. : 4,551,493

DATED : November 5, 1985

INVENTOR(S) : Gerd BLINNE et al.

It is certified that error appears in the above—identified patent and that said Letters Patent is hereby corrected as shown below:

IN THE TITLE PAGE

Please add:

[30] Foreign Application Priority Data
    March 1, 1983  Fed. Rep. of Germany....... 3307051

Signed and Sealed this

Twenty-fifth Day of February 1986

[SEAL]

Attest:

DONALD J. QUIGG

Attesting Officer

Commissioner of Patents and Trademarks